US007258713B2

(12) United States Patent
Eubank et al.

(10) Patent No.: US 7,258,713 B2
(45) Date of Patent: Aug. 21, 2007

(54) INLET VANE FOR CENTRIFUGAL PARTICLE SEPARATOR

(75) Inventors: Gerry E. Eubank, Arlington, TX (US); Robert Dingess, Sagamore Hills, OH (US)

(73) Assignee: Dreison International, Inc., Cleveland, OH (US)

( * ) Notice: Subject to any disclaimer, the term of this patent is extended or adjusted under 35 U.S.C. 154(b) by 551 days.

(21) Appl. No.: 10/927,611

(22) Filed: Aug. 27, 2004

(65) Prior Publication Data

US 2006/0045731 A1 Mar. 2, 2006

(51) Int. Cl.
*B01D 45/12* (2006.01)

(52) U.S. Cl. ............................ 55/401; 55/404; 55/457

(58) Field of Classification Search ............... 55/385.3, 55/396, 401, 404, 406, 457
See application file for complete search history.

(56) References Cited

U.S. PATENT DOCUMENTS

| | | | |
|---|---|---|---|
| 1,359,693 A | 11/1920 | Gill | |
| 569,578 A | 5/1945 | Nyborg et al. | |
| 2,717,044 A | 9/1955 | Kubota | |
| 3,075,743 A | 1/1963 | Sheets | |
| 3,670,480 A | 6/1972 | Petersen | |
| 4,201,557 A | 5/1980 | Petersen | |
| 4,459,141 A * | 7/1984 | Burrington et al. | 55/391 |
| 4,514,146 A | 4/1985 | Nojiri et al. | |
| 5,022,903 A | 6/1991 | Decker | |
| 5,449,391 A | 9/1995 | Decker | |
| 5,766,315 A | 6/1998 | Moredock | |
| 6,110,246 A | 8/2000 | Eubank | |
| 6,280,493 B1 | 8/2001 | Eubank | |
| 6,352,473 B1 | 3/2002 | Clark | |
| 6,451,080 B1 | 9/2002 | Rocklitz et al. | |
| 6,471,485 B1 | 10/2002 | Rossmann et al. | |
| 6,655,921 B2 | 12/2003 | Kocian | |

* cited by examiner

*Primary Examiner*—Robert Hopkins
(74) *Attorney, Agent, or Firm*—Fay Sharpe LLP

(57) ABSTRACT

A centrifugal particle separator includes a first vane assembly and a second vane assembly. The first vane assembly includes a centrally positioned hub, a collar encircling the hub and a plurality of first vanes. Each first vane can have an inner end connected to the hub and an outer end connected to the collar, wherein a trailing edge of at least one of the plurality of first vanes can extend past an edge of the collar. The second vane assembly includes a centrally positioned hub, a collar encircling the hub and a plurality of second vanes circumferentially disposed about the hub. Each second vane can have an inner end connected to the hub and an outer end connected to the collar, wherein a leading edge of at least one of the plurality of second vanes can extend past an edge of the collar. When the first and second vane assemblies are secured together, at least one of the plurality of first vanes protrudes into the second vane assembly.

35 Claims, 10 Drawing Sheets

INLET VANE FOR CENTRIFUGAL PARTICLE SEPARATOR

BACKGROUND OF THE INVENTION

The present invention generally pertains to centrifugal particle separators. More particularly, the invention relates to a construction which improves the functional, structural and volumetric characteristics of molded or cast inlet vane assemblies of centrifugal particle separators.

Generally, air precleaners are used for removing particulates from the air prior to introducing the air through an air cleaner or filter of an internal combustion engine. The function of the air precleaner is to remove as many contaminants from the air as possible before it flows into an air filter medium upstream from the internal combustion engine.

Precleaners operate on the principle of centrifugal separation. Outside air, with its entrained contaminants, is drawn into the precleaner by the vacuum created by the engine. The air and contaminants traverse a set of fixed, static, vanes which cause the air to circulate at a great speed. Centrifugal force throws the contaminants and moisture towards the outer wall of the precleaner. The contaminants follow the wall until they reach an opening where they are discharged back into the atmosphere or collected. Clean, dry air is then allowed to enter the air filter and subsequently the internal combustion engine.

Undesirable contaminants in the atmosphere include particulate matter such as dirt, dust, sand, snow and the like. While most engines include air filters which are meant to remove such contaminants from the air that feeds the engine, engine precleaners are also used in order to extend the life of the air filter and extend the engine's life.

As air precleaners work on centrifugal separation, greater air flow velocity will result in better separation between air and contaminants. As the velocity of air flow decreases, the centrifugal force on the contaminants also decreases reducing the separation efficiency of the precleaner.

Several different designs of air precleaners are commercially available in the marketplace. In one design, a precleaner uses a rotatable impeller or spinner to separate particles from air, discharge the dirty air and particle mixture circumferentially from a housing and direct the clean air to the air intake structure of an engine. The clean air moves centrally through a stack to the engine in response to a vacuum pressure on the air moving to the engine. Known air precleaners have also included a design in which air flows into the top of the precleaner and flows axially downwardly through the precleaner and into the intake stack of the engine. Also, some air precleaners are only useable when positioned in one orientation, i.e. positioned on a vertical axis or positioned on a horizontal axis.

Typically, air precleaners of molded construction utilize a centrifugal particle separator having a one-piece inlet vane. This inlet vane generally has a gap between each blade on the vane for tooling clearances. This gap (commonly referred to as a "shut-off" clearance) allows a portion of the air to pass axially through the particle separator, effectively bypassing the intended swirling route established by the vane blades. This "shut-off" clearance increases as the designed maximum flow of the precleaner increases. This necessitates a particle separator of an undesirably large axial and circumferential volume, having a narrow operational flow range and less than optimum separation efficiency.

Accordingly, it has been considered desirable to develop a new and improved centrifugal particle separator incorporating overlapping inlet vanes assemblies which would overcome the foregoing difficulties and others while providing better and more advantageous overall results.

BRIEF SUMMARY OF THE INVENTION

In an exemplary embodiment of the invention, a centrifugal particle separator is provided.

More particularly, in accordance with this aspect of the present invention, the centrifugal particle separator comprises a first vane assembly and a second vane assembly. The first vane assembly includes a centrally positioned hub, a collar encircling the hub and a plurality of first vanes. Each first vane has at least one of an inner end connected to the hub and an outer end connected to the collar, wherein a trailing edge of at least one of the plurality of first vanes extends past an edge of the collar. The second vane assembly includes a centrally positioned hub, a collar encircling the hub and a plurality of second vanes circumferentially disposed about the hub. Each second vane has at least one of an inner end connected to the hub and an outer end connected to the collar. When the first and second vane assemblies are secured together, at least one of the plurality of first vanes protrudes into the second vane assembly.

In accordance with another aspect of the present invention, a centrifugal particle separator comprises a first vane assembly and a second vane assembly. The first vane assembly includes a centrally positioned hub, a collar encircling the hub, and a plurality of first vanes circumferentially disposed about the hub. Each first vane has at least one of a radially inner end connected to the hub and a radially outer end connected to the collar, wherein a trailing edge of at least one first vane extends past an edge of the collar. The second vane assembly includes a centrally positioned hub, a collar encircling the hub, and a plurality of second vanes circumferentially disposed about the hub. Each second vane has at least one of a radially inner end connected to the hub and a radially outer end connected to the collar, wherein a leading edge of at least one second vane extends past an edge of the collar. The first vane assembly is selectively secured to the second vane assembly so as to allow the trailing edge of at least one first vane to be masked by the leading edge of at least one second vane.

In accordance with still another aspect of the present invention, a centrifugal particle separator comprises a first vane assembly and a second vane assembly. The first vane assembly includes a central portion including a sidewall, a collar encircling the central portion, and a plurality of first vanes circumferentially disposed about the central portion. At least one first vane includes a radially inner end connected to the central portion sidewall and a radially outer end connected to an inner sidewall of the collar. A trailing edge of at least one of the plurality of first vanes extends past an edge of the collar. The second vane assembly includes a central portion including a sidewall, a collar encircling the central portion, and a plurality of second vanes circumferentially disposed about the hub. At least one second vane includes a radially inner end connected to the central portion sidewall and a radially outer end connected to an inner sidewall of the collar. A leading edge of at least one of the plurality of second vanes extends past an edge of the collar. Fastening means are provided for selectively securing the first vane assembly to the second vane assembly.

Still other aspects of the invention will become apparent from a reading and understanding of the detailed description of the preferred embodiments hereinbelow.

BRIEF DESCRIPTION OF THE DRAWINGS

The present invention may take physical form in certain parts and arrangements of parts, preferred embodiments of which will be described in detail in this specification and illustrated in the accompanying drawings which form a part of the invention.

DETAILED DESCRIPTION OF THE PREFERRED EMBODIMENTS

Figure 1:
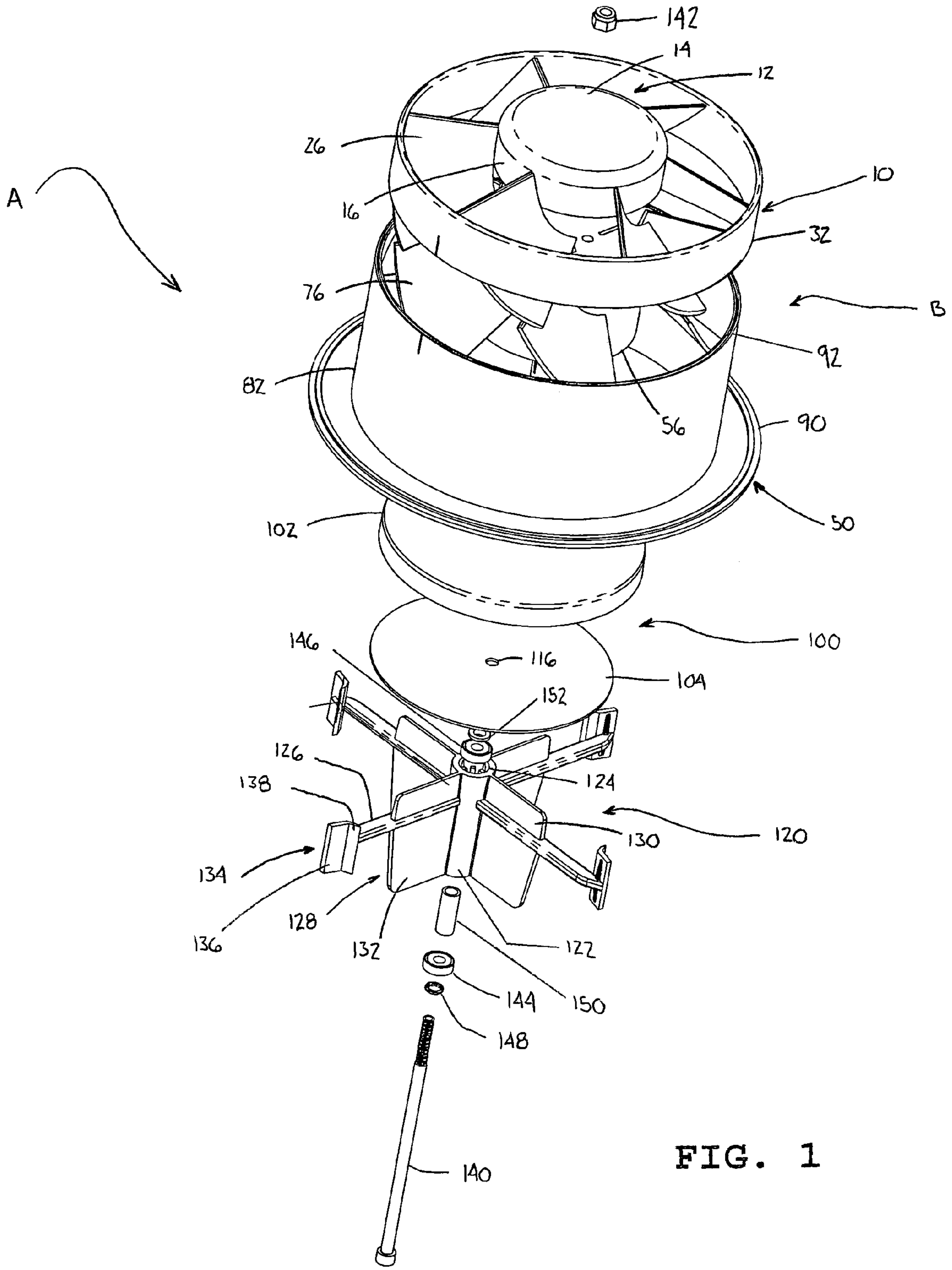
FIG. 1 is an exploded front perspective view of an air precleaner assembly including a centrifugal particle separator according to a first preferred embodiment of the present invention.
Figure 2:
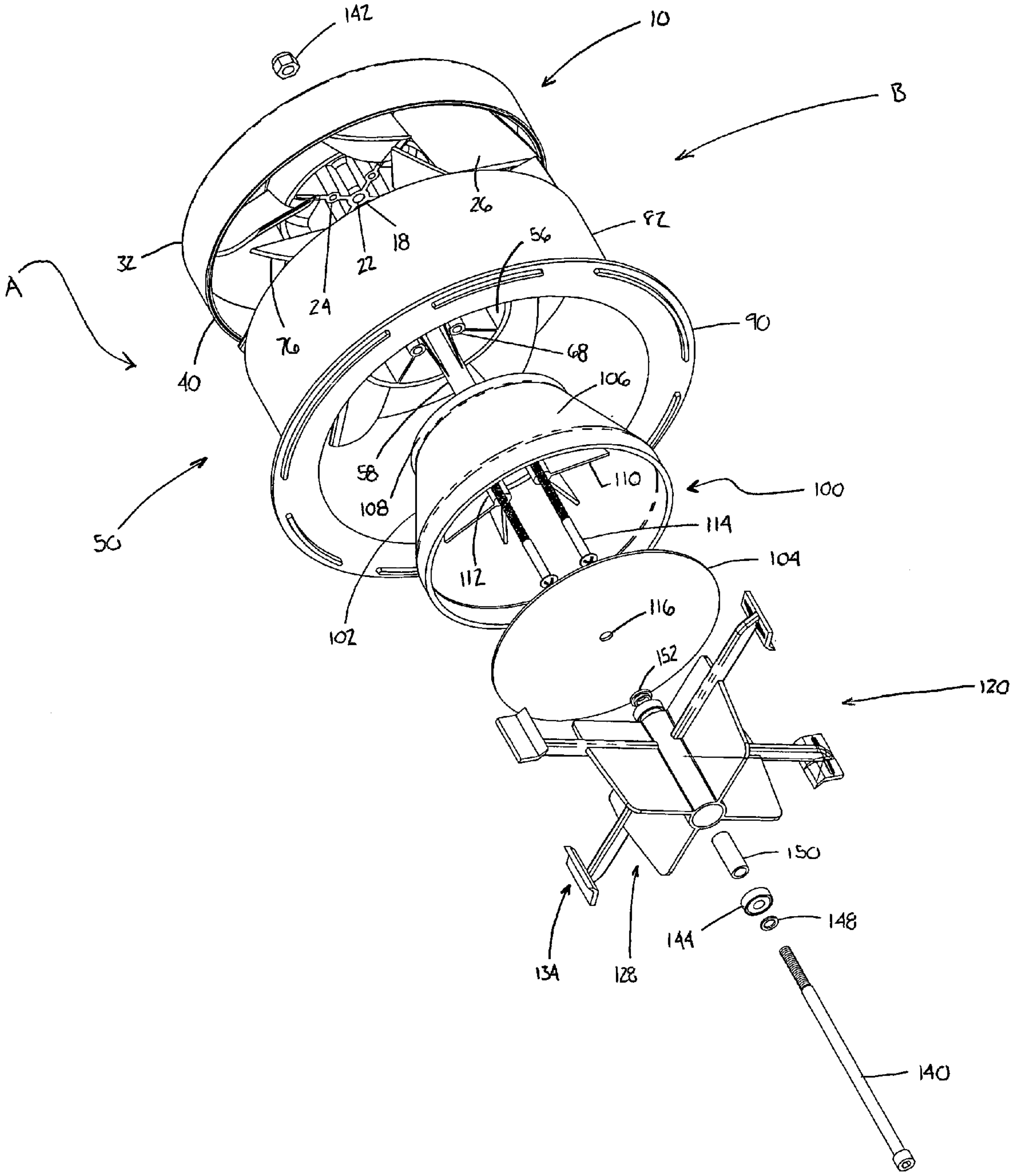
FIG. 2 is an exploded rear perspective view of the air precleaner assembly of FIG. 1.

Referring now to the drawings, wherein the showings illustrate the preferred embodiments of the invention only and are not intended to limit same, FIGS. 1 and 2 show an air precleaner assembly A including a centrifugal particle separator B in accordance with a first embodiment of the present invention. While the centrifugal particle separator is shown as part of an air precleaner assembly, it should be appreciated that the present invention can be used in various applications which operate on the principal of centrifugal separation to remove contaminants from air. The air precleaner assembly includes the centrifugal particle separator B comprising a first vane assembly 10 and a second vane assembly 50; a masking assembly 100; and a rotating impeller assembly 120.

In this embodiment, the first vane assembly 10 is mounted atop the second vane assembly 50 because the air precleaner assembly A is orientated along a vertical axis. Therefore, the first vane assembly 10 will be termed hereafter the upper vane assembly and the second vane assembly 50 will be termed hereafter the lower vane assembly. It should be recognized, however, that if the air precleaner assembly A were to extend along a horizontal axis, the terms "upper" and "lower" would lose their respective meaning.

Figure 4:
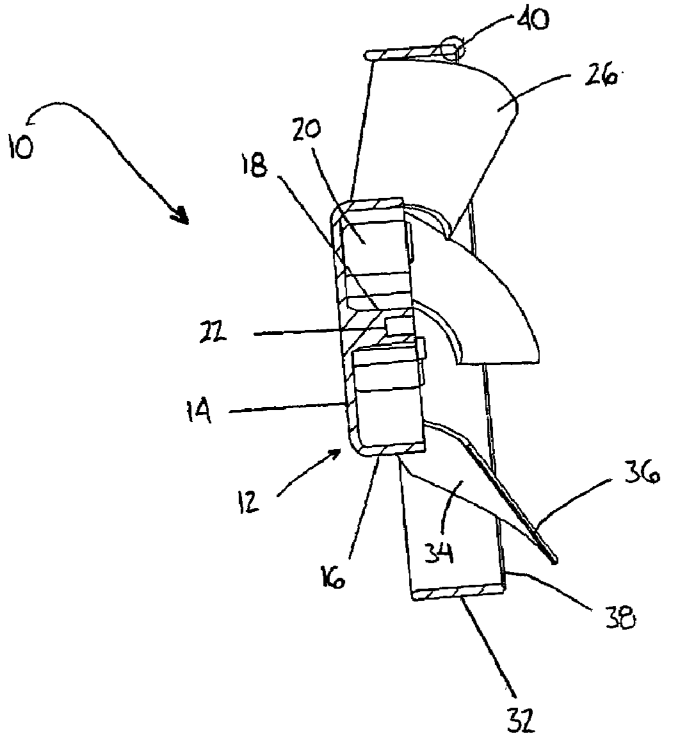
FIG. 4 is a cross-sectional view of the first vane assembly of FIG. 3, taken generally along the line A-A of FIG. 3.
Figure 3:
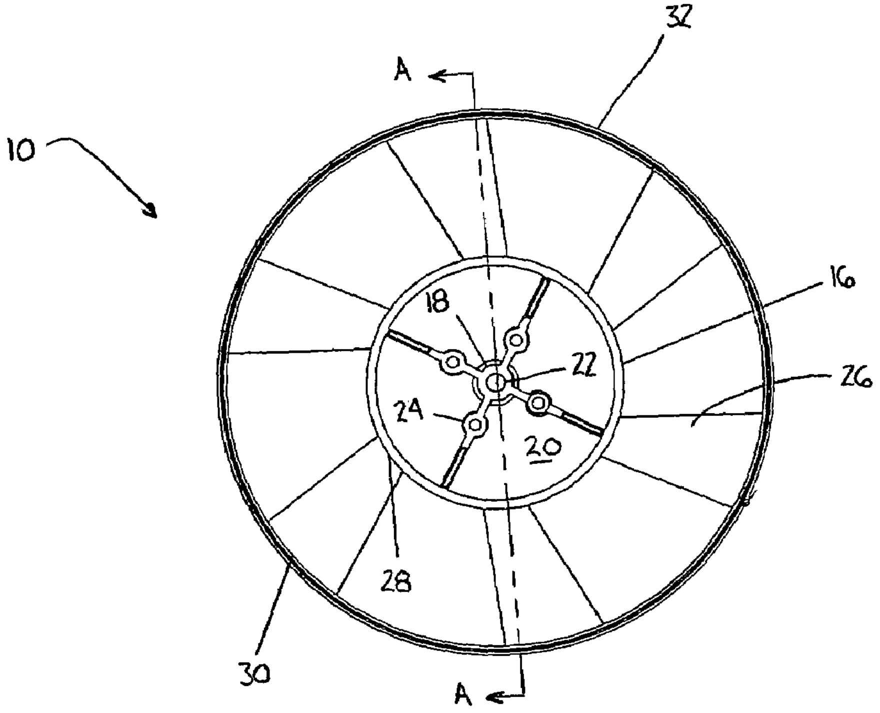
FIG. 3 is a rear elevational view of a first vane assembly of the centrifugal particle separator used in the air precleaner assembly of FIG. 1.

With reference to FIGS. 3 and 4, the upper vane assembly 10 includes a centrally positioned hub 12 and a plurality of vanes 26 circumferentially disposed about the hub 12. The hub blocks direct access of an airflow into the air precleaner A. The hub includes a top wall 14 and a peripheral skirt 16 depending therefrom. A stem 18 extends axially from the top wall 14 parallel to the skirt 16. The stem is approximately cruciform in a plan view. The skirt 16 and the stem 18 define between them a pie-shaped chamber 20. An opening 22 extends through the stem 18. The top wall 14 includes at least one depending boss 24. The boss receives a fastening means for selectively securing the upper vane assembly 10 to the lower vane assembly 50 as will be more fully described below.

With continued reference to FIG. 3, in this embodiment, each upper vane of the plurality of vanes 26 has a radially inner end 28 secured to the skirt 16 of the hub 12 and a radially outer end 30 secured to a collar 32 encircling the hub. Each upper vane can be angled downwardly and laterally about the hub and can have a concave surface 34 along which inlet air flows. If desired, the degree of concavity of each vane can change along the length of the vane. A trailing edge 36 of each upper vane can extend below a lower edge 38 of the collar 32. It should be appreciated that there can be embodiments of the invention where not all trailing edges 36 would extend below a lower edge 38 of the collar 32. As shown in FIGS. 2 and 3, the lower edge of the collar 32 includes an axially extending flange 40 for releasably securing the upper vane assembly 10 to the lower vane assembly 50.

Figure 6:
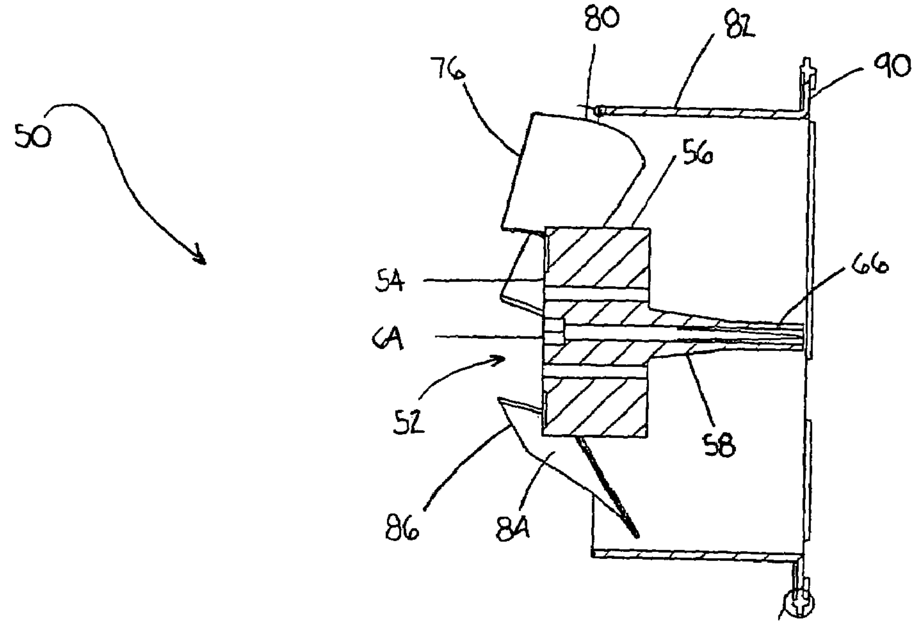
FIG. 6 is a cross-sectional view of the second vane assembly of FIG. 5, taken generally along the line A-A of FIG. 5.
Figure 5:
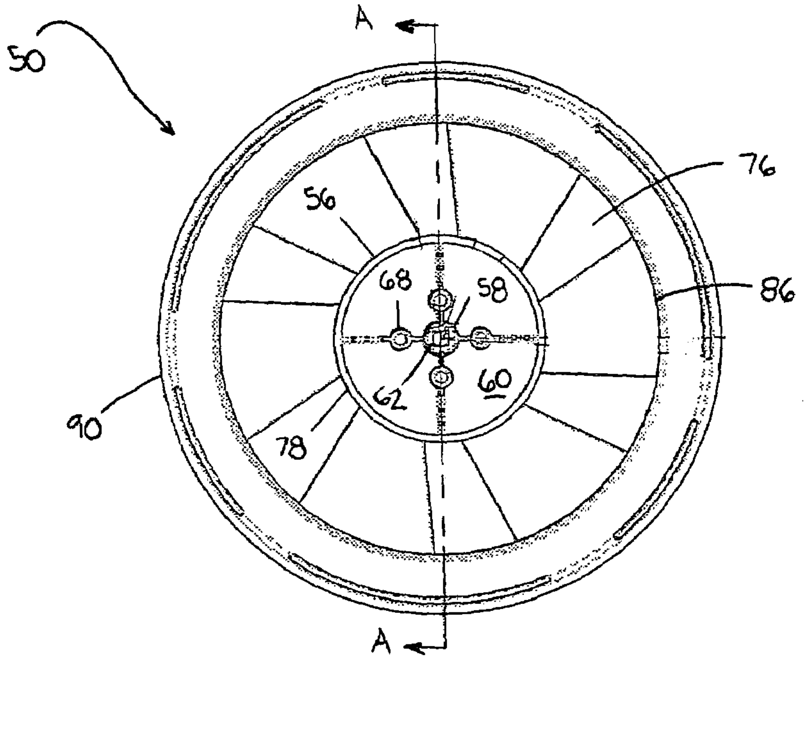
FIG. 5 is a rear elevational view of a second vane assembly of the centrifugal particle separator used in the air precleaner assembly of FIG. 1.
Figure 7:
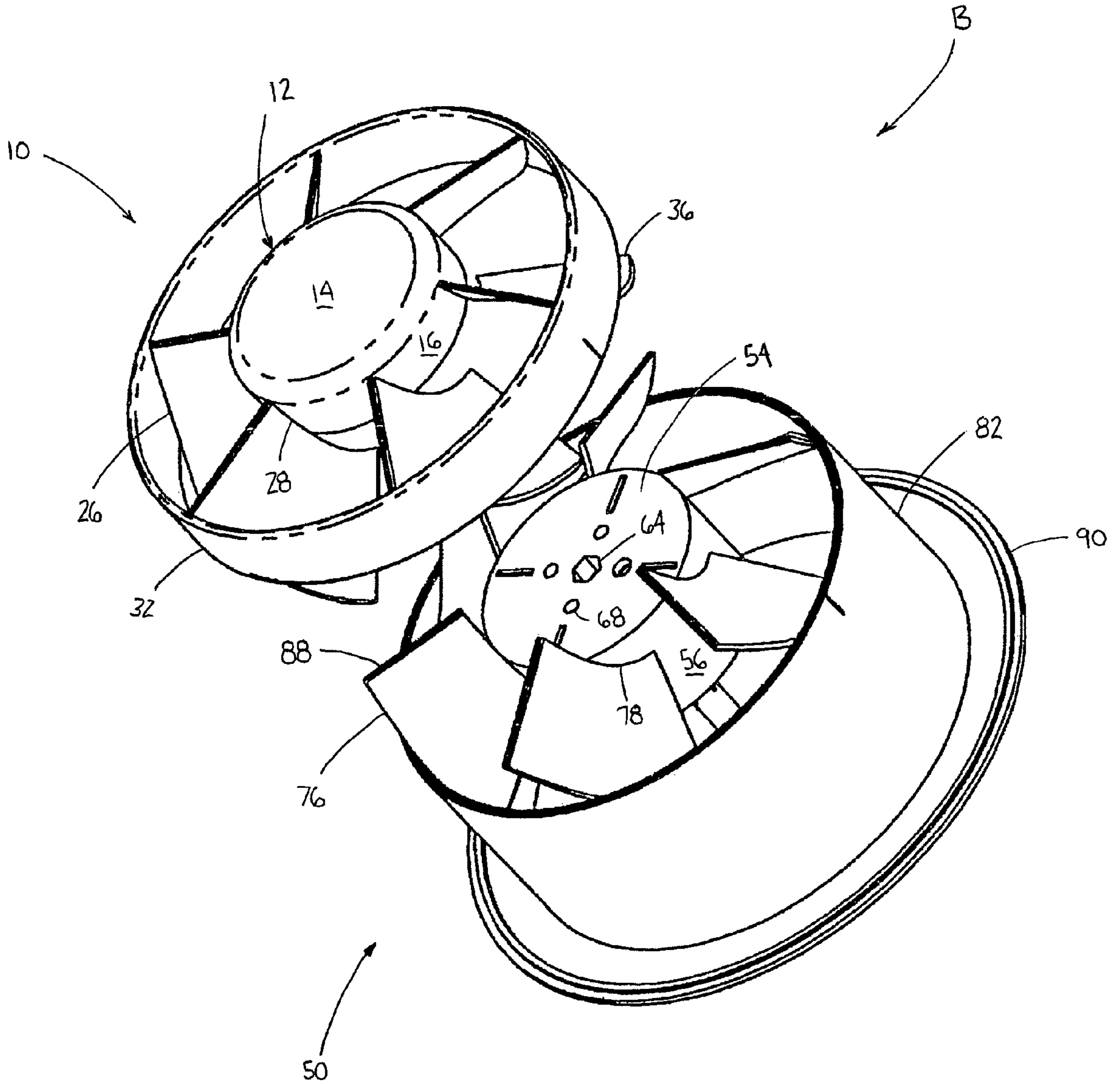
FIG. 7 is an exploded front perspective view of the first and second vane assemblies of the centrifugal particle separator used in the air precleaner assembly of FIG. 1.

With reference to FIGS. 5 and 6, the lower vane assembly 50 includes a centrally positioned hub 52 including a top wall 54 and a peripheral skirt 56 depending therefrom. A stem 58 extends axially from the top wall 54 and parallel to the skirt 56. The stem 58 is approximately cruciform in a plan view and is on the same longitudinal axis as the stem 18 of the upper vane assembly 10. The skirt 56 and the stem 58 define between them a pie-shaped chamber 60. An opening 62 extends through the stem 58 and can comprise an enlarged diameter hexagonally shaped socket section 64, as is best illustrated in FIG. 7, and a reduced diameter circular section 66. The top wall 54 includes at least one depending boss 68. The boss receives a fastening means for selectively securing the upper vane assembly 10 to the lower vane assembly 50 as will be more fully described below.

With continued reference to FIG. 5, a plurality of vanes 76 is circumferentially disposed about the hub 52. In this embodiment, each lower vane has a radially inner end 78 secured to the skirt 56 of the hub 52 and a radially outer end 80 secured to a collar 82 encircling the hub. Each lower vane can be angled downwardly and laterally about the hub and can have a concave surface 84 along which inlet air flows. If desired, the degree of concavity of each vane can change along the length of the vane. A leading edge 86 of each lower vane can extend above an upper edge 88 of the collar 82. As with the trailing edges 36 of the upper vanes 26, not all of the leading edges 86 need extend above the upper edge 88 of the collar 82 in all embodiments of the invention. Extending radially outwardly of the collar 82, at a bottom edge thereof, is a horizontal ledge 90. As shown in FIG. 1, the upper edge 88 of the collar 82 includes a recess 92. This recess is dimensioned to receive the axially extending flange 40 for releasably securing the upper vane assembly 10 to the lower vane assembly 50.

The masking assembly 100, as shown in FIG. 2, includes a masking hood 102 and a seal plate 104 selectively secured to a bottom end on the masking hood. Preferably, the masking hood has a general conical conformation for directing the inlet air to the rotating impeller assembly 120. However, it can be appreciated by one skilled in the art that the contour of the masking hood depends on the requirements needed for the end use of the air precleaner A. The masking hood includes a sidewall 106 and an axial flange 108 extending from a top end which abuts against a bottom end of the peripheral skirt 56. Extending radially inward from the masking hood 102 is at least one gusset 110. The gusset has one end secured to an interior surface of the sidewall 106 and a second end secured to a depending boss 112. The boss has an aperture adapted to receive a fastener 114. The fastener secures the masking assembly 100 to the centrifugal particle separator B (as will be described in greater detail below). The seal plate 104 includes an opening 116 which receives a bolt 140. The bolt secures the seal plate within the bottom end of the masking hood 102.

With reference again to FIG. 1, positioned adjacent the masking assembly 100 is the rotating impeller assembly 120. The rotating impeller assembly comprises a hub 122 having a bore 124 extending axially therethrough. Preferably, four arms 126 radiate away from the hub. Of course, more or less than four arms could be employed for the rotating impeller assembly. This would depend to some extent on the size of the air pre-cleaner. Secured to the hub 122 is a plurality of first blades 128, each of which is aligned with a respective one of the arms 126. The first blades are located at the proximal ends of the several arms. Each first blade 128 includes a first section 130 which is positioned above its respective arm and a second section 132 which is positioned below its respective arm.

Located at the distal end of each of the arms 126 is a respective second blade 134. Each second blade can be of compound shape. Each second blade 134 includes a first section 136 which is substantially aligned with its respective arm 126 and a second section 138 which is oriented at an angle to the first section 136. The second blades of the impeller are of a shape that will not unload with increasing static pressure. The relationship of the sizeable first blades 128 and the compound second blades 134 combine to provide a blade assembly which will not unload at increasing static pressures. These blades combine to convert the rotational velocity of the impeller to static pressure at ejection ports better than straight, forward or backward curved blades. The unique shape of the second blades 134 combined with the fact that these blades are rotating in the perimeter of the air leaving the inlet vanes 26, 76 of the centrifugal particle separator B provides for particle extraction by both low pressure and centrifugal force as well as by mechanical separation.

A pair of bearings 144 and 146 can be positioned in the hub bore 124. The bearings 144 and 146 enable the rotating impeller assembly to smoothly rotate in relation to the centrifugal particle separator B. A washer 148 can be positioned between a head of the bolt and the lower bearing 144. Also provided in this embodiment is a tubular bearing spacer 150 and a step washer 152 adjacent the upper bearing 146. The spacer is inserted in the bore 124 between the two bearings to prevent side loading of the bearings. The step washer 152 is illustrated with the smaller diameter end of the washer resting on the adjacent bearing 146 and the larger diameter end resting on the bottom seal plate 104. Alternatively, two washers of different diameters can be stacked.

Figure 8:
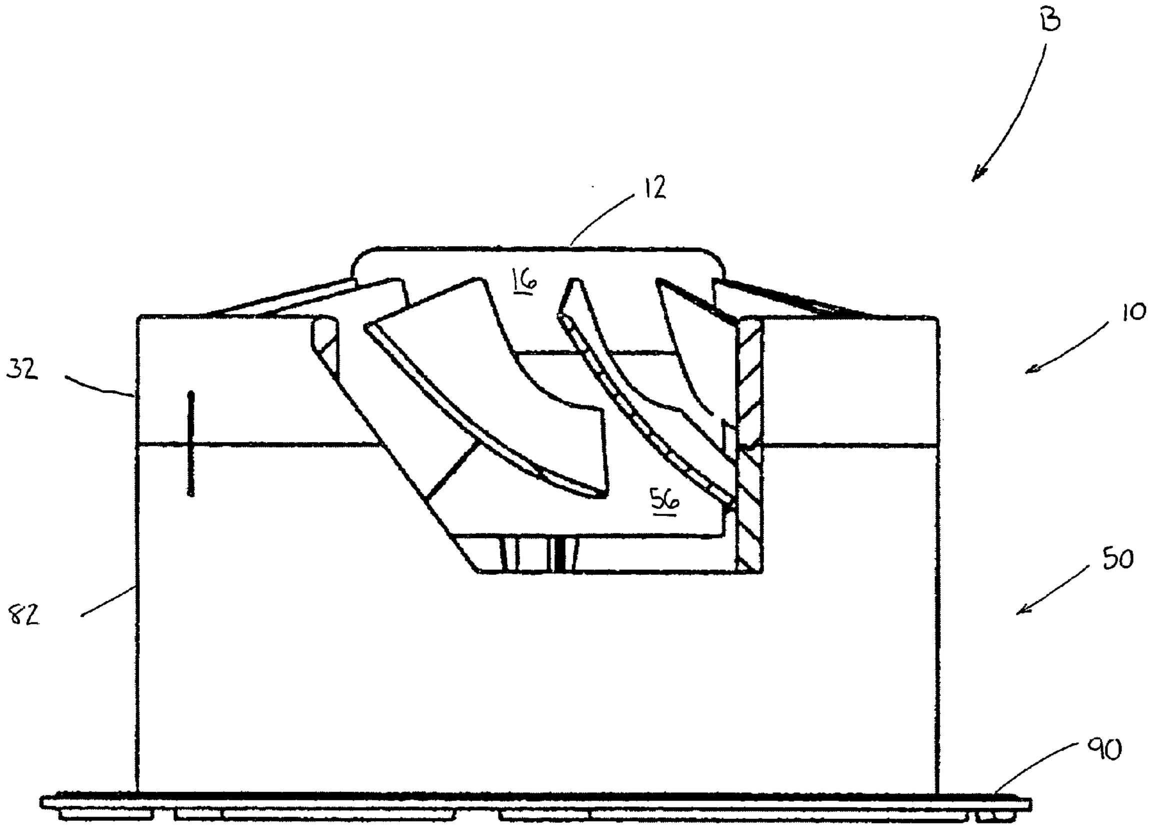
FIG. 8 is a perspective view, partially broken away, of the first and second vane assemblies of FIG. 7 in an assembled form.

To assemble the air precleaner A, the collar 32 of the upper vane assembly 10 is first releasably secured to the collar 82 of the lower vane assembly 50 by inserting the axially extending flange 40 in the recess 92. As shown in FIG. 8, this stacking of the vane assemblies allows the trailing edge 36 of at least one upper vane 26 to be masked by the leading edge 86 of at least one lower vane 76. The masking assembly 100 is then secured to the assembled centrifugal particle separator B by extending the fastener 114 through the boss 112 of the masking hood 102, through the boss 68 of the lower vane assembly 50 and into the boss 24 of the upper vane assembly 10. As the fastener is being secured in the boss 24, the axial flange 108 of the masking hood 102 abuts against a bottom edge of the peripheral skirt 56 of the lower vane assembly 50. Thus, the masking assembly 100 secures the vane assemblies together.

Also provided is a fastening means for securing the rotating impeller assembly 120 to the centrifugal particle separator B. The fastening means can comprise the bolt 140 and the lock nut 142. The lock nut is generally hexagonally shaped and is positioned in the hexagonally shaped socket section 64, which is best shown in FIG. 7. The bolt extends upwardly through the hub 122 from the bottom end of the rotating impeller assembly 120, through the opening 116 of the seal plate 104, through the opening 62 of the stem 58 of the lower vane assembly 50 and into the socket section 64 thereof. As the bolt 140 is being secured to the lock nut 142, an end portion of the bolt extends through the top wall 54 of the hub 52 of the lower vane assembly and into the opening 22 of the stem 18 of the upper vane assembly 10. The mounting of the bolt in the lock nut further secures the seal plate 104 to the bottom end on the masking hood 102 and the larger diameter end of the step washer 152 onto the seal plate.

With the air precleaner assembly A illustrated herein, atmospheric air flows around the hub 12 and across the vanes 26 of the upper vane assembly 10 and the vanes 76 of the lower vane assembly 50. Due to the overlapping vane design and the smooth curved shape of the inlet vanes 26 and 76, the air acquires a strong swirling motion as it flows into the rotating impeller assembly 120. The concave inlet vanes 26 and 76 illustrated in FIG. 7 will provide more spin for a given amount of forward motion. The degree of concavity changes along the length of the vane. In otherwords, as is illustrated in FIGS. 3 and 5, the vanes 26 and 76 are more concave at their leading edge than at their trailing edge.

With reference to FIG. 1, the swirling nature of the air flow impels heavier than air dirt particles and moisture radially outward. The swirling nature of the air flow propels the blades 128 and 134 to begin rotation of the rotating impeller assembly 120 thereby increasing the rotational vortex and further propelling particles in the airstream radially outward.

It should be apparent that the hub 12 of the upper vane assembly blocks direct access of the inlet air into an air inlet pipe of a vehicle's internal combustion engine (not shown) on which the air precleaner assembly A can be mounted. Further, the location of the collar 82 of the lower vane assembly 50 is such as to partially mask the second blades 134 providing higher vane speed for better ejection of particulates in the air stream.

Similar to the aforementioned first preferred embodiment, a second preferred embodiment is shown in FIGS. 9-12. Since most of the function is substantially identical, reference numerals with a single primed suffix (') refer to like components (e.g., upper vane assembly is referred to by reference numeral 10'), and new numerals identify new components.

Figure 9:
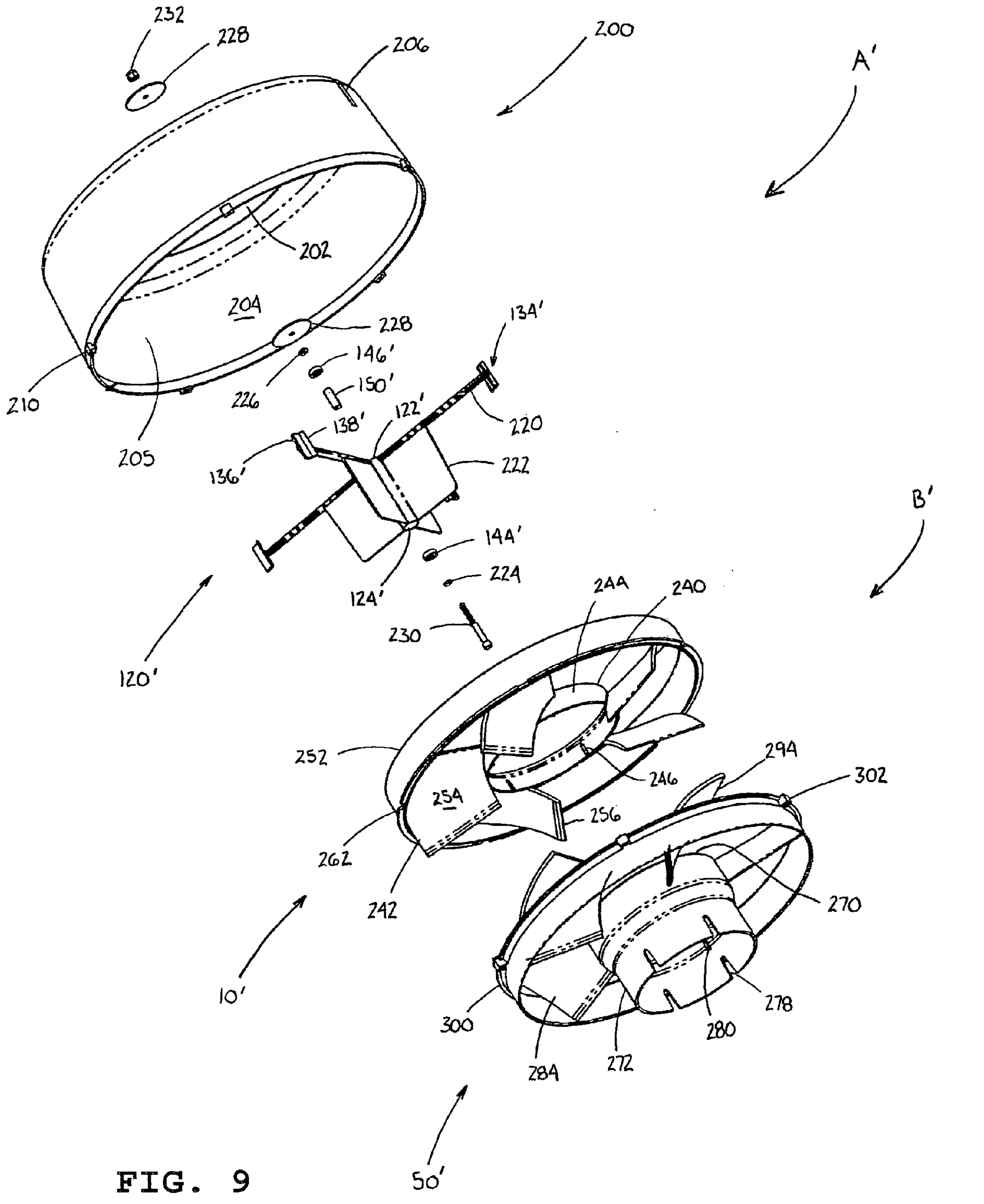
FIG. 9 is an exploded rear perspective view of an air precleaner assembly including a centrifugal particle separator according to a second preferred embodiment of the present invention.

With reference to FIG. 9, an air precleaner assembly A' including a centrifugal particle separator B' in accordance with a second preferred embodiment is illustrated. The air precleaner assembly includes the centrifugal particle separator comprising an upper vane assembly 10' and a lower vane assembly 50'; a rotating impeller assembly 120'; and a hood assembly 200 which blocks direct access of an airflow into the air precleaner.

The hood assembly 200 includes an end wall 202 and a skirt 204 depending therefrom. The end wall and the skirt together form a first chamber 205 for accommodating the impeller assembly 120'. As shown in FIG. 9, the skirt 204 includes a discharge opening 206 in the shape of a vertically extending slot. In this embodiment, one discharge opening is shown. However, it can be appreciated by one skilled in the art that more discharge openings can be employed, if desired. The discharge opening 206 communicates with the first chamber 205 and provides an exit passage for the air and particulates (as will be described in greater detail below). Located on a collar 208 encircling a distal end of the skirt 204 is a plurality of spaced protrusions 210. The protrusions extend radially from the collar. The hood assembly 200 can have a slight taper from the end wall 202 to a distal end of the skirt 204. This construction, in conjunction with the vertical openings 206 allows for easy moldability of the hood assembly.

Positioned beneath the hood assembly 200 is the rotating impeller assembly 120'. The rotating impeller assembly comprises a hub 122' having a bore 124' extending axially therethrough. In this embodiment, four arms 220 radiate away from the hub. Of course, more or less than four arms could be employed for the rotating impeller assembly. Secured to the hub 122' is a plurality of first blades 222, each of which is aligned with a respective one of the arms 220. The first blades are located at the proximal ends of the several arms. Located at the distal ends of each of the arms 220 is a respective second blade 134'. Each second blade includes a first section 136' which is substantially aligned with its respective arm 220 and a second section 138' which is oriented at an angle to the first section 136'.

A pair of bearings 144' and 146' can be positioned in the hub bore 124'. The bearings 144' and 146' enable the rotating impeller assembly to smoothly rotate in relation to the centrifugal particle separator B'. A first washer 224 can be positioned between a head of a bolt 230 and the lower bearing 144'. Also provided is a tubular bearing spacer 150' and a step washer 226 adjacent the upper bearing 146'. The spacer is inserted in the bore 124' between the two bearings to prevent side loading of the bearings. The step washer 226 is illustrated with the smaller diameter end of the washer resting on the adjacent bearing 146' and the larger diameter end resting on a second washer 228.

Also provided is a fastening means for securing the rotating impeller assembly 120' to the hood assembly 200. The fastening means can comprise a bolt 230, a lock nut 232, and two second washers 228. The lock nut can be generally hexagonally shaped and is positioned adjacent the second washer and end wall 202. The bolt extends upwardly through the hub 122' from a bottom end of the rotating impeller assembly 120'. As the bolt 230 is being secured to the lock nut 232, the rotating impeller assembly 120' is rotatably secured to the hood assembly 200.

Figure 10:
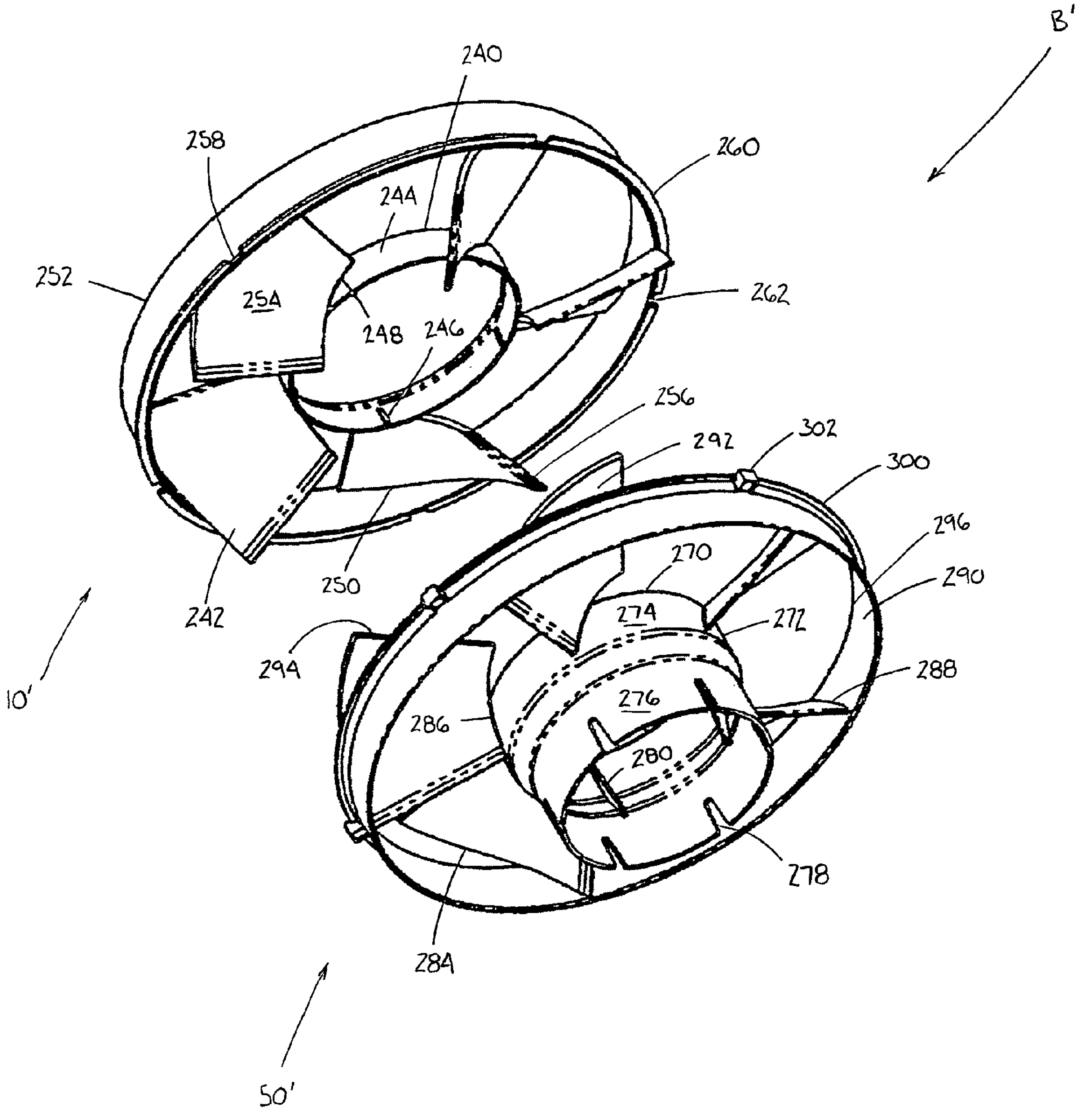
FIG. 10 is an exploded rear perspective view of the first and second vane assemblies of the centrifugal particle separator used in the air precleaner assembly of FIG. 9.

With reference now to FIG. 10, the centrifugal particle separator B' comprises the upper vane assembly 10' and the lower vane assembly 50'. The upper vane assembly 10' includes a centrally positioned hub 240 and a plurality of vanes 242 circumferentially disposed about the hub 240. The hub includes a sidewall or peripheral skirt 244. The sidewall includes at least one slot 246 for releasably securing the upper vane assembly 10' to the lower vane assembly 50', as will be described in greater detail below.

With continued reference to FIG. 10, in this embodiment, each upper vane of the plurality of vanes 242 can have a radially inner end 248 secured to the sidewall 244 of the hub 240 and a radially outer end 250 secured to a collar 252 encircling the hub. Each upper vane can be angled downwardly and laterally about the hub and can have a concave surface 254 along which inlet air flows. If desired, the degree of concavity of each vane 242 can change along the length of the vane. A trailing edge 256 of each upper vane can extend below a lower edge 258 of the collar 252. It should be appreciated that there can be embodiments of the invention where not all trailing edges 258 would extend below the lower edge 258 of the collar 252. The lower edge of the collar includes a radially extending flange 260 having at least one recess 262. In one embodiment, five such recesses are provided.

Figure 11:
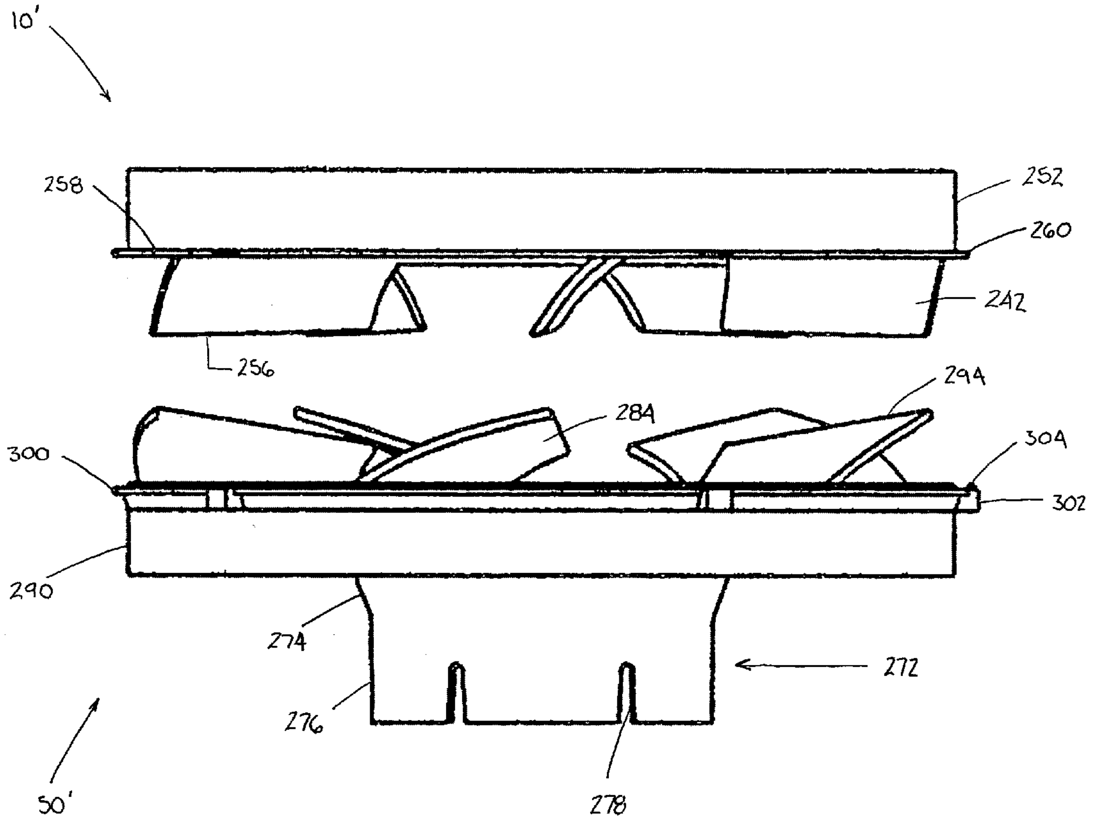
FIG. 11 is an exploded side elevational view of the first and second vane assemblies of the centrifugal particle separator used in the air precleaner assembly of FIG. 9.

As shown in FIG. 10, the lower vane assembly 50' can include a centrally positioned hub 270 including a sidewall or peripheral skirt 272 which functions as a clean air outlet tube to an air inlet pipe of a vehicle's internal combustion engine. The sidewall includes a first portion 274 and a second portion 276. The first portion has a first diameter and the second portion has a second diameter. In this embodiment, the first diameter is larger than the second diameter. As shown in FIG. 11, the second portion 276 includes at least one slot 278 for selectively securing the lower vane assembly 50' to an open inlet side of air intake pipes or stacks of an internal combustion engine (not shown). Extending radially inward from an inner surface of the sidewall 272 is at least one radially extending tab 280 (FIG. 10). The tab extends through the slot 246 in the upper vane assembly 10' in order to releasably secure the upper vane assembly to the lower vane assembly 50'.

A plurality of vanes 284 is circumferentially disposed about the hub 270. In this embodiment, each lower vane has a radially inner end 286 secured to the sidewall 272 of the hub 270 and a radially outer end 288 secured to a collar 290 encircling the hub. Each lower vane can be angled downwardly and laterally about the hub and can have a concave surface 292 along which inlet air flows. If desired, the degree of concavity of each vane can change along the length of the vane. A leading edge 294 of each lower vane can extend above an upper edge 296 of the collar. As with the trailing edges 256 of the upper vanes 242, not all of the leading edges 294 need extend above the upper edge 294 of the collar 290 in all embodiments of the invention.

Figure 12:
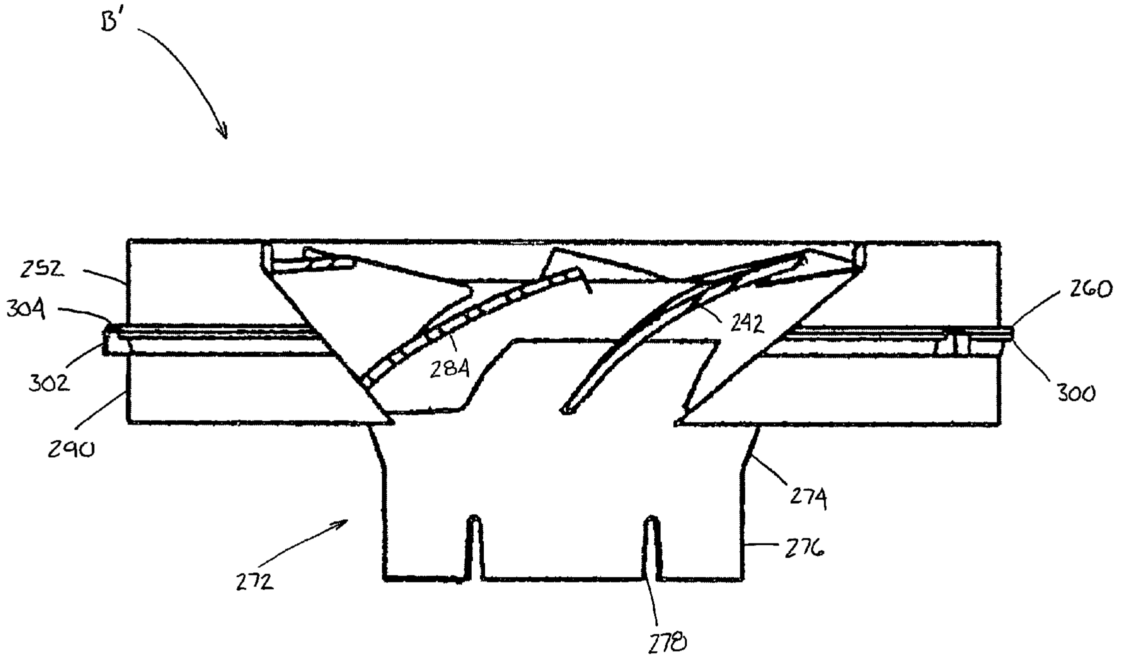
FIG. 12 is a side elevational view, partially broken away, of the first and second vane assemblies of FIG. 11 in an assembled form.

As shown in FIG. 12, the stacking of the vane assemblies allows the trailing edge 256 of at least one upper vane 242 to be masked by the leading edge 294 of at least one lower vane 284.

Extending radially outwardly of the collar 290, at a bottom edge thereof, is a horizontal ledge 300. Extending radially outwardly from the ledge is a plurality of spaced protrusions 302. As shown in FIG. 11, each of the protrusions has an upwardly extending tab 304. In this embodiment, five such protrusions are provided. These protrusions 302 are aligned with the protrusions 210 on the hood assembly 200. The tabs 304 extend through the recess 262 in the upper vane assembly 10' and into the openings (not shown) of the protrusions 210 in order to secure the hood assembly 200 to the lower vane assembly 50'. Once secured, a portion of the blades 222 of the rotating impeller assembly 120' are housed in the hubs 240 and 270 of the upper and lower vane assemblies 10' and 50'.

With the air precleaner assembly A' including the centrifugal particle separator B' illustrated in the second preferred embodiment, and with the air precleaner positioned in an upright orientation, atmospheric air flows upwardly over the vanes 284 of the lower vane assembly 50' and the vanes 242 of the upper vane assembly 10' into the centrifugal particle separator B'. As the air flows upwardly across the vanes 284 and 242, the air is caused to spin in a spiral direction as the air flows into the first chamber 205. As is best illustrated in FIG. 9, the concave inlet vanes 242 and 284 will provide more spin for a given amount of forward motion. The degree of concavity can change along the length of the vane. In other words, as is illustrated in FIG. 10, the vanes 242 and 284 are more concave at their leading edge than at their trailing edge. Swirling air acts on the plurality of first blades 222 and causes the impeller assembly 120' to rotate. The rotating impeller assembly 120' is operative to produce a positive pressure adjacent the discharge opening 206 and to insure the positive flow of air and entrained particles out through the discharge opening 206. The circular swirling nature of the air flow establishes centrifugal forces on the air dirt particles and moisture impelling the dirt particles and moisture to travel radially outwardly away from the hub 122' of the impeller assembly toward the skirt 204 of the hood assembly 200. The second blades 134' function as small impellers or pumps which force air to flow outwardly toward the inside wall of the skirt 204 and out through the discharge opening 206. Further, the angular inclination of the second blades 134' causes a flow of air outwardly and thereby keeps the air moving to prevent the settling and separation of the particles and moisture from the air. Meanwhile, the cleaned air is caused to flow radially inward and then downward through the peripheral skirts 244 and 272 toward an intake of an adjacent internal combustion engine. In other words, the end wall 202 of the hood assembly 200 causes the upwardly flowing swirling air to change direction and flow radially inwardly. The air then flows axially downwardly toward the internal combustion engine.

Typically, the masking assembly 100, the rotating impeller assembly 120 and hood assembly 200 are all made of a suitable conventional thermoplastic material. Of course, it should be recognized that one or more of these components could also be made from any other conventional type of material, such as a metal (e.g. aluminum or the like) and composite materials (e.g. carbon fiber reinforced resin material). In the preferred embodiments of the present invention, the upper vane assembly 10 and the lower vane assembly 50 are each of one piece and can be made of a conventional polymer material or a composite material including resin such that the vane assemblies are formed in a single molding operation.

In accordance with the present disclosure, the air precleaner assembly A removes undesirable contaminants from an airstream prior to the airstream reaching an air filter (not illustrated) of an internal combustion engine. The overlapping inlet vanes 26 and 76 of the upper and lower vane assemblies 10 and 50 of the centrifugal particle separator B increase the ability of the air precleaner assembly to remove contaminants from the intake air and reduce the required axial and radial dimensions of the air precleaner for any designed airflow capability.

Prior to the present invention, plastic and polymer precleaners had to include mold "shut-off clearances" for tooling purposes. This "shut-off clearance" allowed a portion of the airstream to travel axially (referred to as "blow-by") through the air precleaner A, effectively bypassing the intended swirling route established by a centrifugal particle separator B. The present invention eliminates this "blow-by" by overlapping the inlet vanes 26 and 76, which can have identical vane profiles. While the "shut-off clearance" is maintained to produce each of the upper and lower vane assemblies, it is eliminated from the assembled centrifugal particle separator due to the stacking of the upper and lower vane assemblies 10 and 50 together.

One aspect of the present invention resides in the improved efficiency over prior single inlet vane centrifugal particle separators by eliminating the "blow-by" caused by the "shut-off clearance." Other aspects of the present invention reside in improved corrosion resistance, manufacturing economy, structural integrity and weight reduction over prior centrifugal particle separators with overlapping inlet vanes due to the upper vane assembly 10 and the lower vane assembly 50 being of one piece and made of a conventional polymer material or composite.

The exemplary embodiments of the present invention have been described with reference to several preferred embodiments. Obviously, modifications and alterations will occur to others upon reading and understanding the preceding detailed description. It is intended that the invention not be limited to the embodiments described. Rather, the present invention should be construed as including all such modifications and alterations which come within the scope of the appended claims or the equivalents thereof.

What is claimed is:

1. A centrifugal particle separator comprising:
a first vane assembly including:
a centrally positioned hub,
a collar encircling the hub and
a plurality of first vanes circumferentially disposed about the hub, each first vane having at least one of an inner end connected to the hub and an outer end connected to the collar,
wherein a trailing edge of at least one of the plurality of first vanes extends past an edge of the collar; and
a second vane assembly including a centrally positioned hub,
a collar encircling the hub and
a plurality of second vanes circumferentially disposed about the hub, each second vane having at least one of an inner end connected to the hub and an outer end connected to the collar,
wherein when said first and second vane assemblies are secured together, said at least one of said plurality of first vanes protrudes into said second vane assembly.

2. The particle separator of claim 1 wherein a leading edge of at least one of the plurality of second vanes extends past an edge of the collar and protrudes into the first vane assembly.

3. The particle separator of claim 1 wherein at least one vane of the first vane assembly and at least one vane of the second vane assembly has a concave surface along which inlet air flows and wherein a degree of concavity of said at least one vane changes along the length of said vane.

4. The particle separator of claim 3 wherein at least one vane of the first vane assembly and at least one vane of the second vane assembly is angled downwardly and laterally about its hub.

5. The particle separator of claim 1 wherein the first vane assembly is secured to the second vane assembly so as to allow the trailing edge of at least one first vane to be masked by the leading edge of at least one second vane.

6. The particle separator of claim 1 wherein the hub of the first vane assembly includes a peripheral skirt which includes at least one slot adjacent an edge for selectively securing the first vane assembly to the second vane assembly.

7. The particle separator of claim 1 wherein the hub of the first vane assembly includes a top wall and a stem depending from the top wall.

8. The particle separator of claim 7 wherein the stem is approximately cruciform in a plan view and includes at least one bore therein.

9. The particle separator of claim 7 wherein the top wall includes at least one depending boss for receiving an associated fastener for selectively securing the first vane assembly to the second vane assembly.

10. The particle separator of claim 1 wherein the hub of the second vane assembly includes a peripheral skirt.

11. The particle separator of claim 10 wherein the peripheral skirt includes at least one radially extending tab for selectively securing the second vane assembly to the first vane assembly.

12. The particle separator of claim 1 wherein the hub of the second vane assembly includes a top wall and a stem depending from the top wall.

13. The particle separator of claim 12 wherein the stem is approximately cruciform in a plan view and includes at least one bore therein.

14. The particle separator of claim 12 wherein the stem includes at least one aperture for receiving an associated fastener for selectively securing the first vane assembly to the second vane assembly.

15. The particle separator of claim 1 wherein the first vane assembly includes a ledge extending radially outward from an edge of the collar.

16. The particle separator of claim 1 wherein the second vane assembly includes a ledge extending radially outward from an edge of the collar.

17. The particle separator of claim 1 further comprising an impeller assembly operatively associated with said first and second vane assemblies.

18. The particle separator of claim 1 wherein the first vane assembly is of one piece and comprises a polymer material and the second vane assembly is of one piece and comprises a polymer material.

19. A centrifugal particle separator comprising:

a first vane assembly including:

a centrally positioned hub, a collar encircling the hub, and a plurality of first vanes circumferentially disposed about the hub, each first vane having at least one of a radially inner end connected to the hub and a radially outer end connected to the collar, wherein a trailing edge of at least one first vane extends past an edge of the collar;

a second vane assembly including:

a centrally positioned hub, a collar encircling the hub, and a plurality of second vanes circumferentially disposed about the hub, each second vane having at least one of a radially inner end connected to the hub and a radially outer end connected to the collar, wherein a leading edge of at least one second vane extends past an edge of the collar; and wherein the first vane assembly is selectively secured to the second vane assembly so as to allow the trailing edge of at least one first vane to be masked by the leading edge of at least one second vane.

20. The particle separator of claim 19 wherein the hub of the first vane assembly includes a sidewall.

21. The particle separator of claim 20 wherein the hub of the first vane assembly includes top wall and a depending stem spaced from the sidewall, the stem including an opening extending through at least a portion thereof.

22. The particle separator of claim 19 wherein the hub of at least one of the first vane assembly and the second vane assembly includes at least one slot adjacent an edge for selectively securing the first vane assembly to the second vane assembly.

23. The particle separator of claim 19 wherein the hub of the first vane assembly includes at least one downwardly extending boss for receiving an associated fastener for selectively securing the first vane assembly to the second vane assembly.

24. The particle separator of claim 19 wherein the hub of the second vane assembly includes a sidewall.

25. The particle separator of claim 24 wherein the hub of the second vane assembly includes a top wall and a depending stem spaced from the sidewall including an opening extending therethrough.

26. The particle separator of claim 19 wherein the hub of at least one of the first vane assembly and the second vane assembly includes at least one radially extending tab for selectively securing the second vane assembly to the first vane assembly.

27. The particle separator of claim 19 wherein the hub of the second vane assembly includes at least one aperture for receiving an associated fastener for selectively securing the first vane assembly to the second vane assembly.

28. The particle separator of claim 19 wherein the first vane assembly includes a ledge extending radially outward from an edge of the collar.

29. The particle separator of claim 19 wherein the second vane assembly includes a ledge extending radially outward from an edge of the collar.

30. A centrifugal particle separator comprising:

a first vane assembly including:

a central portion including a sidewall, a collar encircling the central portion, and a plurality of first vanes circumferentially disposed about the central portion, at least one first vane including a radially inner end connected to the central portion sidewall and a radially outer end connected to an inner sidewall of the collar wherein a trailing edge of at least one of the plurality of first vanes extends past an edge of the collar;

a second vane assembly including:

a central portion including a sidewall, a collar encircling the central portion, and a plurality of second vanes circumferentially disposed about the hub, at least one second vane including a radially inner end connected to the central portion side wall and a radially outer end connected to an inner sidewall of the collar wherein a leading edge of at least one of the plurality of second vanes extends past an edge of the collar; and fastening means for selectively securing the first vane assembly to the second vane assembly.

31. The particle separator of claim 30 wherein the trailing edge of at least one first vane is masked by the leading edge of at least one second vane.

32. The particle separator of claim 30 wherein the first vane is of one piece and comprises a thermoplastic material.

33. The particle separator of claim 30 wherein the second vane is of one piece and comprises a thermoplastic material.

34. The particle separator of claim 30 wherein a flange extends radially away from the outer periphery of the collar of the first vane assembly.

35. The particle separator of claim 30 wherein a flange extends radially away from the outer periphery of the collar of the second vane assembly.

* * * * *